(12) United States Patent
Wilson et al.

(10) Patent No.: US 7,269,435 B2
(45) Date of Patent: Sep. 11, 2007

(54) SYSTEM AND METHOD FOR FACILITATING COMMUNICATIONS IN A NETWORK

(75) Inventors: Timothy J. Wilson, Rolling Meadows, IL (US); Sanjay Dua, Mountain View, CA (US); Paul M. Erickson, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 234 days.

(21) Appl. No.: 10/747,964

(22) Filed: Dec. 30, 2003

(65) Prior Publication Data

US 2005/0143078 A1 Jun. 30, 2005

(51) Int. Cl.
*H04B 7/00* (2006.01)
*H04M 1/38* (2006.01)
*H04Q 7/20* (2006.01)

(52) U.S. Cl. .................. 455/519; 455/448; 455/444; 455/416; 455/518

(58) Field of Classification Search .............. 455/416, 455/507, 515, 517, 518, 519, 520, 524, 67.11, 455/448, 444
See application file for complete search history.

(56) References Cited

U.S. PATENT DOCUMENTS

| 5,930,723 | A | * | 7/1999 | Heiskari et al. ............ 455/518 |
|---|---|---|---|---|
| 6,219,548 | B1 | | 4/2001 | Feltner et al. |
| 6,385,461 | B1 | * | 5/2002 | Raith .......................... 455/518 |
| 6,405,050 | B1 | * | 6/2002 | Amirijoo et al. ........... 455/518 |
| 6,442,396 | B1 | * | 8/2002 | Schmidt et al. ............. 455/518 |
| 6,564,049 | B1 | * | 5/2003 | Dailey ......................... 455/416 |
| 6,665,521 | B1 | * | 12/2003 | Gorday et al. ........... 455/67.11 |
| 6,725,052 | B1 | * | 4/2004 | Raith .......................... 455/518 |

* cited by examiner

Primary Examiner—George Eng
Assistant Examiner—Un C. Cho

(57) ABSTRACT

A system and method for facilitating communications amongst a plurality of mobile units in a network establishes a plurality of underlay communication cells (201, 220, 222). At least two of the plurality of mobile units are positioned in at least one of the underlay communication cells, the units being capable of communications via the underlay communication cells (201, 220, 222). An overlay communication cell (212) is established and covers the same area as at least the underlay cells (201, 220, 222) that include the at least two of the plurality of mobile units. An association between underlay cells (201, 220, 222) is established that include the at least two mobile units and the overlay communication cell (212). A group communication call is established between the at least two mobile units using the overlay cell.

17 Claims, 4 Drawing Sheets

SYSTEM AND METHOD FOR FACILITATING COMMUNICATIONS IN A NETWORK

FIELD OF THE INVENTION

The invention relates generally to communication systems and more particularly to transmitting messages in communication networks.

BACKGROUND OF THE INVENTION

Systems and methods for transmitting communications within wireless networks and between wireless networks are well known. In one example, a call from a user at a source mobile unit is transmitted across a wireless network to another user at a destination mobile unit. The wireless network is typically grouped into one or more geographic organizational units called cells, where the destination mobile unit may reside. The network routes the call across the wireless network using a wireless infrastructure and according to various messaging techniques and technologies that are well-known in the wireless technology field.

Wireless or cellular calls may be classified as being of several different types. For example, a cellular call may be a point-to-point call between two wireless users. In this case, conventional wireless transmission techniques are used to send the message between the two users. In another example, the cellular call may be a group call between multiple users. In this case, known techniques are used to form and conduct a group call using the cells in the network.

Wireless systems can be easily modified to provide higher capacities for point-to-point calls because the capacity of the system can be easily increased to virtually any value without shrinking the size of cells in the network. In contrast, in known systems performing group communications, it is necessary to decrease the cell size to increase capacity. In addition, group calls use a service manager (voice channel) in each cell that is occupied by one or more group members. Shrinking the size of the cells to increase capacity tends to increase the number of cells activated for each call. Therefore, additional overhead is created in the system further slowing communications. Thus, present systems do not process both group calls and point-to-point calls in a convenient and efficient manner.

Figure 1:
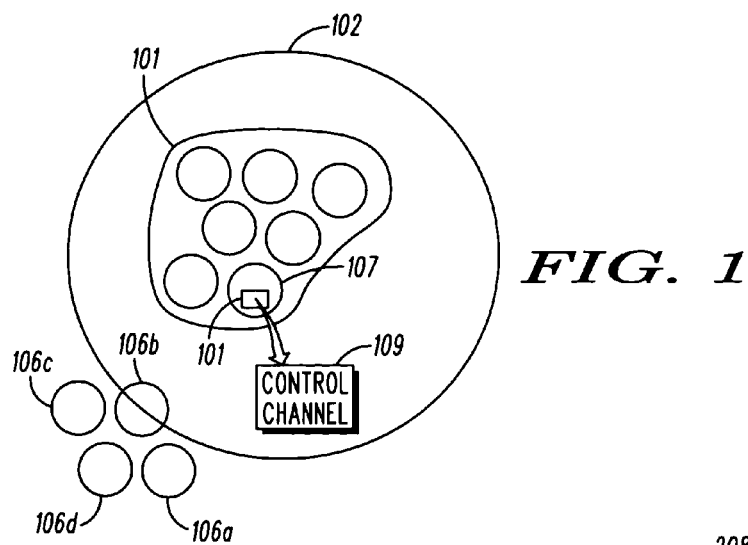
FIG. 1 is a diagram showing an arrangement of overlay and underlay cells in accordance with one embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENTS

Pursuant to many of these embodiments, a system and method for facilitating group communications is provided. In many of the embodiments an overlay cell is provided that provides for group communications amongst mobile units in underlying underlay cells. The system and method establishes and allows group communications to proceed in an efficient and convenient manner. The system and method also allows point-to-point communications to occur without altering the structure or way these point-to-point communications are made.

In one approach, a plurality of underlay communication cells is established. Two mobile units reside in selected ones of the plurality of underlay communication cells and these mobile units may move between the various underlay communication cells. An overlay communication cell is established and covers the same area as at least some of the underlay communication cells, including the underlay communication cells that where the two mobile units are located.

An association is established between each of the underlay cells that include the two mobile units and the overlay communication cell. For instance, a pointer may be configured in the underlay cell to point to a control channel in the overlay cell.

A group communication call is established between the at least two mobile units using the overlay communication cell. In one example, the group call is established by storing information at underlay cells identifying a control channel at the overlay cell for all of the participants of the call to use.

Preferably, the group call may be established by having the mobile units listen for a page. After detecting the page, the mobile units may respond to the page in various ways. For example, the mobile units may determine whether to return the page to the overlay cell and use the overlay cell to establish the group call. In another example, the mobile units may determine when to return the page to the underlay cell and not use the overlay cell to establish the group call. In still another example, the mobile units may determine not to return the page at all. In this case, the proper overlay cell is activated in the absence of receiving a page based upon information stored in the network.

Thus, a system and method are provided where group calls may be established and conducted in an efficient and convenient manner. A call manager is not needed in each cell to manage the group call for mobile units in that cell. Moreover, both group calls and point-to-point calls may established and conducted efficiently using the same infrastructure. In other words, the structure and manner that point-to-point communications are conducted are unchanged and unaffected.

Referring initially to FIG. 1, one example of a system used to a conduct group communication call using an overlay communications cell is described. An overlay communications cell 102 includes a group of underlay cells 104. A group of underlay cells include cells 106a, 106b, 106c, and 106d. It will be realized that each of the underlay cells 104 and 106a-106d contain the functionality of cellular systems, as is known in the art. For instance, these cells may include base stations, base station controllers, and other components as is known in the art. Furthermore, each of the cells may include one or more mobile units (not shown), which freely move amongst the various cells.

A cell 107 within the overlay communication cell 102 includes a pointer 101. The pointer 101 points to a control channel 109 within the overlay communication cell 102. A group communication call may be established between mobile units residing in any of the underlay cells. An initiating mobile unit sends a message to a control unit at the overlay communication cell 02. The message includes a list of all the corresponding mobile units that are members of a talk group. The talk group represents the mobile users for which the group communication call is to be established. A controller at the overlay communication cell 102 instigates the sending of pages to find all of the talk group members. For instance, the controller may cause a page may be send in all the underlay cells that comprises the overlay communication cell 102. If a talk group member resides in an underlay cell, the talk group member uses the pointer in the underlay cell to connect to the control channel of the overlay communication cell 102.

In another example, a determination is made by the talk group member of whether to use the overlay cell for the group communication. A test is performed to determine if a corresponding overlay communication cell exists. Another test may be performed to determine the quality of service at the overlay cell. If either or both of these tests fail, the group communication may be conducted from the underlay cell instead of the overlay cell.

In still another example, the talk group member does not use the overlay communication cell 102 under any circumstances. This determination may be made because of the network loading conditions or other factors. In this case, there would be no need to maintain a pointer at the underlay cell that points to a control channel in the overlay cell.

Figure 2:
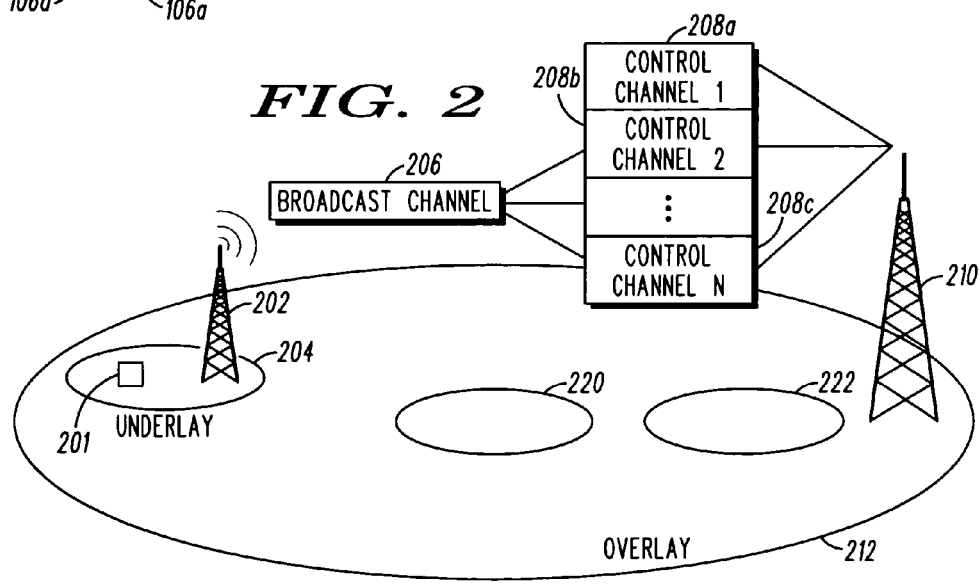
FIG. 2 is a block diagram showing a system for using overlay and underlay cells for group calling in accordance with one embodiment of the invention.

Referring now to FIG. 2, an example of a system for facilitating group communications between mobile units is described. A mobile unit 201 within an underlay cell 204 transmits a communication to a base station controller 202. The base station controller 202 transmits the message via a selected one of broadcast control channels 206 to a base station controller 210 within an overlay cell 212. Underlay cells 220 and 222 also reside within the overlay communication cell 212.

Information on the underlay cell points the communication to a control channel 208a, 208n, through 208c on the overlay communication cell 212. For example, the base station controller 204 may store a pointer indicating the control channel 208a, 208b, and 208c. The mobile unit may be informed at call registration the pointer it will follow. Alternatively, all mobile units within a particular fleet may follow the same pointer to the same control channel on the overlay cell. Similarly, information on the underlay cells 220 and 220 may point to one of the control channels 208a-c.

A group communication call may be established between mobile units residing in the underlay cells 204, 220, and 222. In addition, other underlay cells may exist that are not included in the overlay communication cell 212. These underlay cells may have an associated overlay cell distinct and separate from the overlay communication cell 212 or may have no corresponding or associated overlay communication cell. In any of these cases, a group communication may be established between mobile units in any underlay cell.

An initiating mobile unit sends a message to a control unit at the overlay communication cell 212. The message includes a list of all the corresponding mobile units that are members of the talk group. For example, the mobile unit 201 may send a message indicating members of a talk group to a controller associated with the overlay communication cell 212.

The controller at the overlay communication cell 212 instigates the sending of pages to find all of the talk group members. For instance, a page may be send in all the underlay cells 220 and 222. Also, pages may be produced for underlay cells outside of the overlay cell 212. If a talk group member resides within an underlay cell, the talk group member uses the pointer in the underlay cell to connect to the control channel of the overlay cell. For example, if a mobile unit in the talk group is present in the underlay cell 220, then the mobile unit may use a pointer in the underlay cell 220 to connect with the broadcast channel 206 and one of the control channels 208a-c.

The particular control channel 208a-c may be selected in any number of ways. For example, a particular fleet may have an assigned control channel. In another example, the channel may be selected randomly. Other selection mechanisms are also possible.

Alternatively, a determination may be made by the talk group member of whether to use the overlay cell for the group communication. In this case, a test is performed to determine if a corresponding overlay cell exists. Another test may be performed to determine the quality of service at the overlay cell. If either or both of these tests fail, the group communication may occur from the underlay cell instead of the overlay cell.

In still another example of the establishment of a group communication call, the talk group member may not use the overlay cell 212 under any circumstances. This determination may be made because of the network loading conditions or other factors. In this case, there would be no need to maintain a pointer at the underlay cell that points to a control channel in the overlay cell.

Figure 3A:
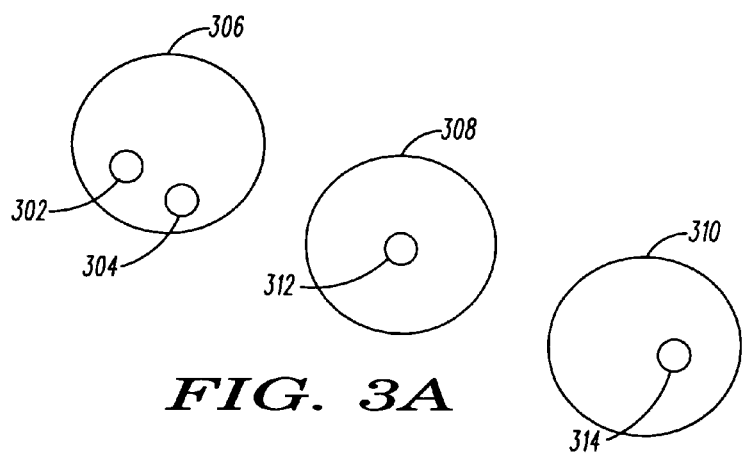
FIG. 3a is a block diagram showing the use of underlay and overlay cells in accordance with one embodiment of the present invention.
Figure 3B:
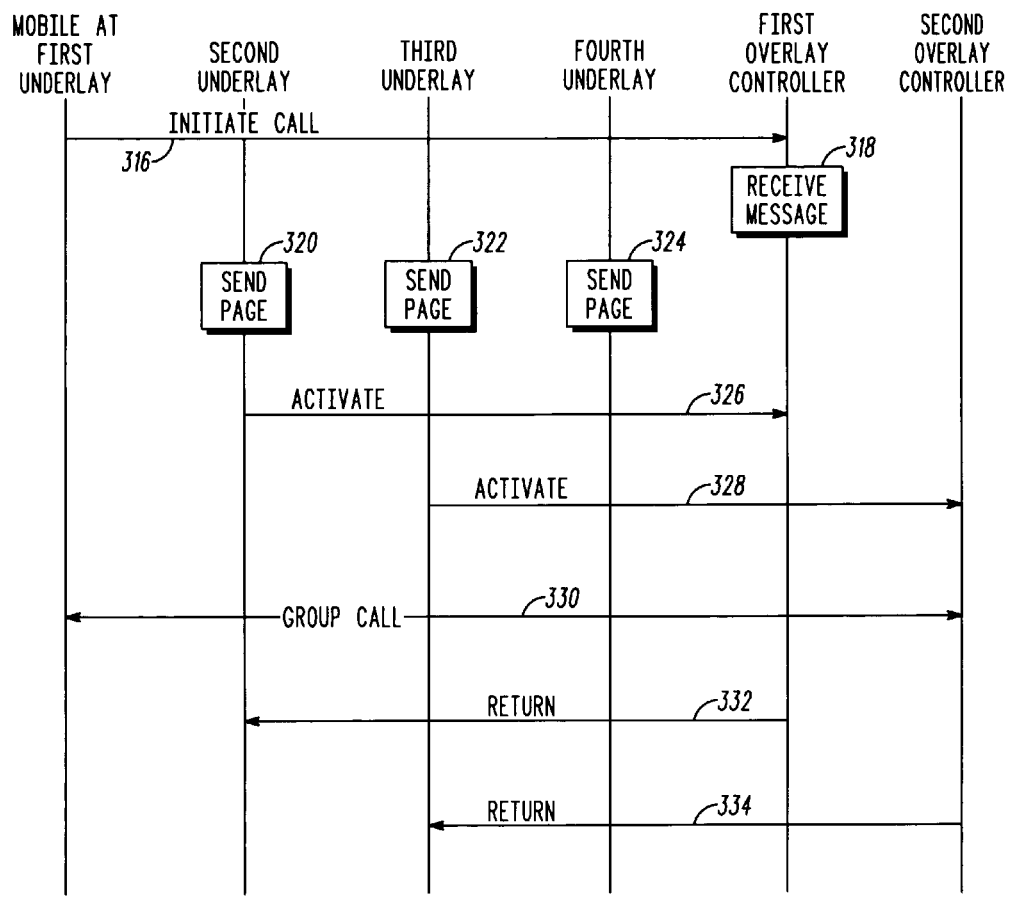
FIG. 3b is a call flow diagram showing the use of underlay and overlay cells in to establish a group communication in accordance with one embodiment of the present invention.

Referring now to FIGS. 3a and 3b, one example of the establishment of a group communication call is described. In this example, the network comprises a first overlay cell 306, a second overlay cell 308, and a third overlay cell 310. The first overlay cell 306 includes first and second underlay cells 302 and 304. The second overlay cell 308 includes a third underlay cell 310, and the third overlay cell 310 includes a fourth underlay cell 314. A group communication is initiated by a mobile in the first underlay cell 302 to include as a talk group itself and mobiles located in the second and third underlay cells 304 and 312.

At step 316, an initiating mobile device at the first underlay cell initiates a group communication call with members of the talk group. The message indicates the identities of the mobiles in the talk group that the initiating mobile device wishes to establish a group communication. These mobile units may be identified in any number of ways, for example, using a unique address or identifier to identify the members of the talk group.

At step 318, the message is received by a controller at a first overlay communication cell. For example, the message may be received by a network control device at the overlay communication cell. However, any other type of processing device may also receive and process the message.

At steps 320, 322, and 324, the controller at the first overlay communication cell initiates the sending of pages and pages are sent to the mobiles indicated in the message. The controller in the first overlay communication cell communicates with controllers in the second and third overlay cells so these controllers can page mobile units residing in the corresponding underlay cells. Then, a page is initiated within all underlay cells within the overlay cell to locate members of the talk group. Thus, a page is transmitted to any mobile within each of the first, second, third, and fourth underlay cells.

An overlay communication cell is activated and used by a mobile unit to conduct the group communication if any talk group member resides within a particular overlay communication cell. In this case, the first and second overlay communication cells are activated at steps 326 and 328 by the mobiles in the second and third underlay cells returning a page to the appropriate overlay communication cell. The underlay cell may include a pointer in the overlay communication cell that points to a control channel in the appropriate overlay cell. The fourth underlay cell within the third overlay cell does not return a page because no mobile unit within the talk group is within the fourth underlay cell.

At step 330, a group call is established. This may be accomplished using the control channel that was specified in the pointer. The control channel may be different for each of the underlay cells. Alternatively, mobiles in the same fleet may use the same control channel.

At steps 332 and 334, the group call ends and the mobile units return to an appropriate underlay cell. This underlay cell may be the same or different than the underlay cell that the mobile unit was originally located. During the time of the group call, measurements are made to indicate the quality of service at the underlay cells. Based upon these measurements, the mobile unit is returned to the best overlay cell.

Figure 4A:
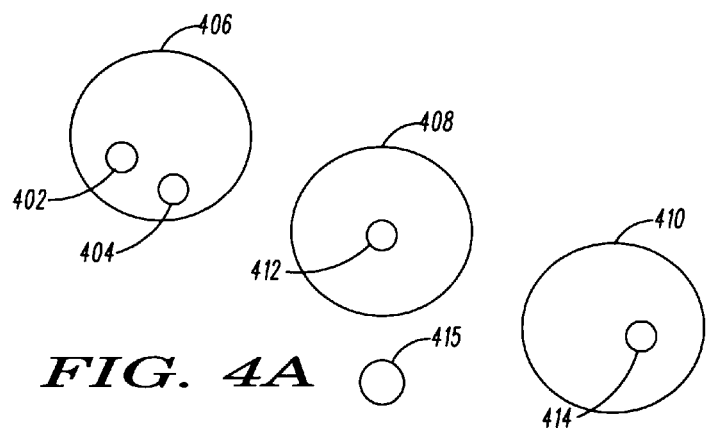
FIG. 4a is a block diagram showing the use of underlay and overlay cells in accordance with one embodiment of the present invention.
Figure 4B:
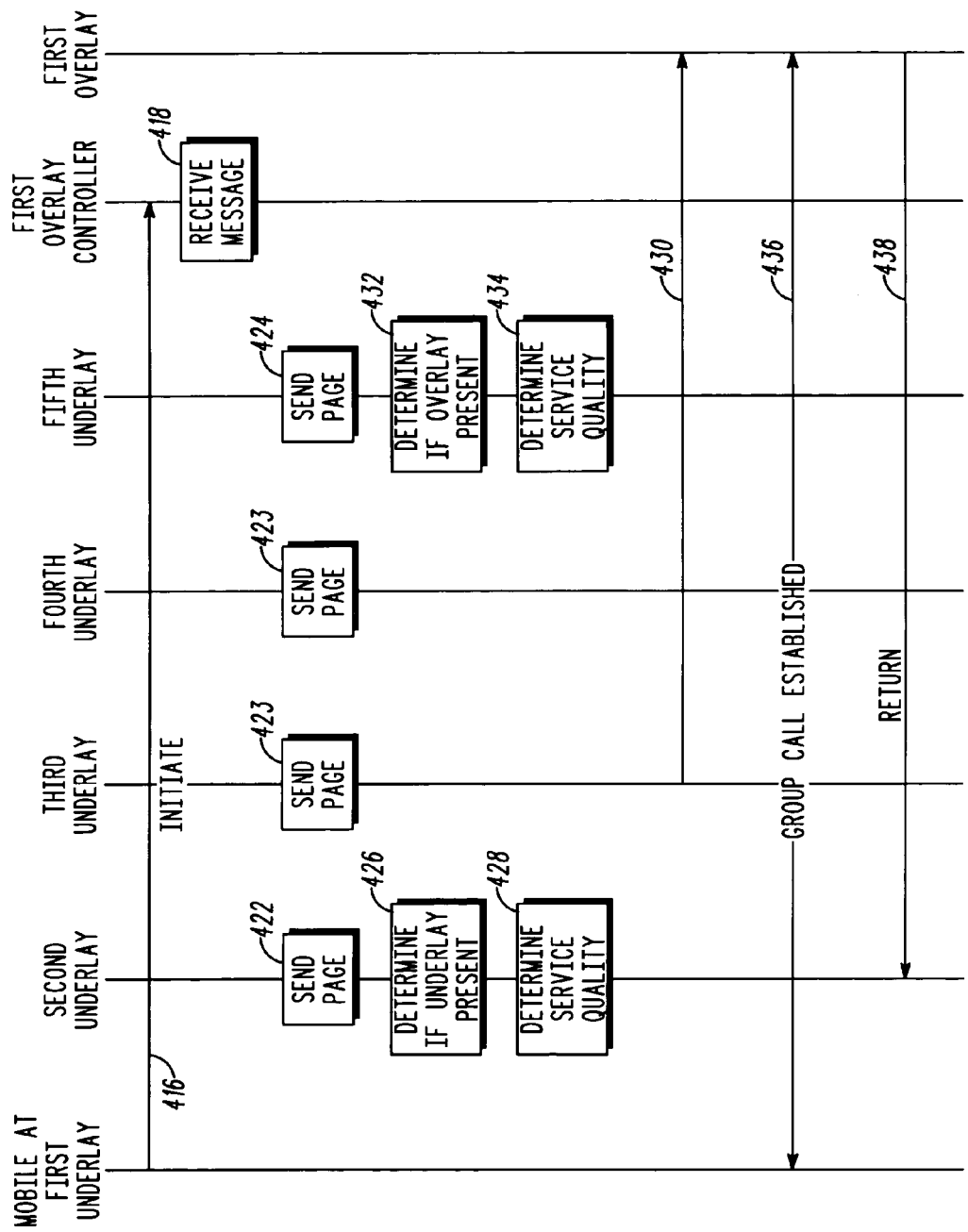
FIG. 4b is a call flow diagram showing another use of underlay and overlay cells to establish a group communication in accordance with one embodiment of the present invention.

Referring now to FIGS. 4*a* and 4*b*, another example of the formation of a group communication call is described. In this example, the network comprises a first overlay cell 406, a second overlay cell 408, and a third overlay cell 410. The first overlay cell 406 includes first and second underlay cells 402 and 404. The second overlay cell 408 includes a third underlay cell 410, and the third overlay cell 410 includes a fourth underlay cell 414. A fifth underlay cell 415 is not included within any overlay cell. A group communication is initiated by a mobile in the first underlay cell 402 to include as a talk group itself and mobiles located in the second and third underlay cells 404 and 415.

At step 416, an initiating mobile device at the first underlay cell initiates a group communication call with members of the talk group. The message indicates the identities of the mobiles in the talk group that the initiating mobile device wishes to establish a group communication. These mobile units may be identified in any number of ways, for example, using a unique address or identifier to identify the members of the talk group.

At step 418, the message is received by a controller at a first overlay communication cell. For example, the message may be received by a network control device at the overlay communication cell. However, any other type of processing device may also receive and process the message.

At steps 420, 422, and 423, and 424, the controller at the first overlay communication cell initiates the sending of pages and pages are sent to the mobiles indicated in the message. The controller in the first overlay communication cell communicates with controllers in the second and third overlay cells so these controllers can page mobile units residing in the corresponding underlay cells. A page is initiated within all underlay cells within all overlay cells to locate members of the talk group and indicates the identity of the members of the talk group. In addition, a page request is made within the fifth underlay cell. Thus, a page is transmitted to any mobile within each of the first, second, third, fourth, and fifth underlay cells.

Since a mobile unit in the talk group is within the second underlay cell, at step 426, the mobile unit determines whether an overlay communication cell is present. For example, an indication may be stored at the underlay as to whether the underlay cell has a corresponding overlay communication cell. At step 428, the mobile unit determines whether the quality of service is acceptable at the overlay. If one or both of these conditions are met, then service continues as discussed above with respect to FIG. 3 where the appropriate overlay is activated at step 430. For instance, the mobile unit may use a pointer in the underlay cell to use a control channel at the overlay cell.

Since a mobile unit in the talk group is within the fifth underlay cell, at step 432, the mobile unit determines whether an overlay communication cell is present. For example, an indication may be stored at the underlay as to whether the underlay cell has a corresponding overlay communication cell. At step 434, the mobile unit determines whether the quality of service is acceptable at the overlay. However, since no overlay exists for the mobile in the fifth underlay cell, the mobile unit does not connect to the overlay and the mobile unit uses the underlay to engage the group call. The group call may be made using techniques that are known in the art to establish group calls amongst cells. In addition, if the service quality as determined at step 434 were unacceptable, the underlay cell would be used for the group communication.

At step 436, the group communication call is established. For example, this may be accomplished by having a pointer in the underlay cell that points to a control channel in the appropriate overlay cell. For the situation where the overlay did not exist and/or the quality of the service at the overlay was unacceptable, the mobile uses the underlay cell to make the group communication rather than the overlay cell.

At steps 438, the mobile unit within the first overlay returns to the second underlay cell. However, the return may be to a different underlay cell than the underlay cell that the mobile unit was originally located. During the time of the group call, measurements are made to indicate the quality of service at the underlay cells. Based upon these measurements, the mobile unit is returned to the best overlay cell.

Figure 5:
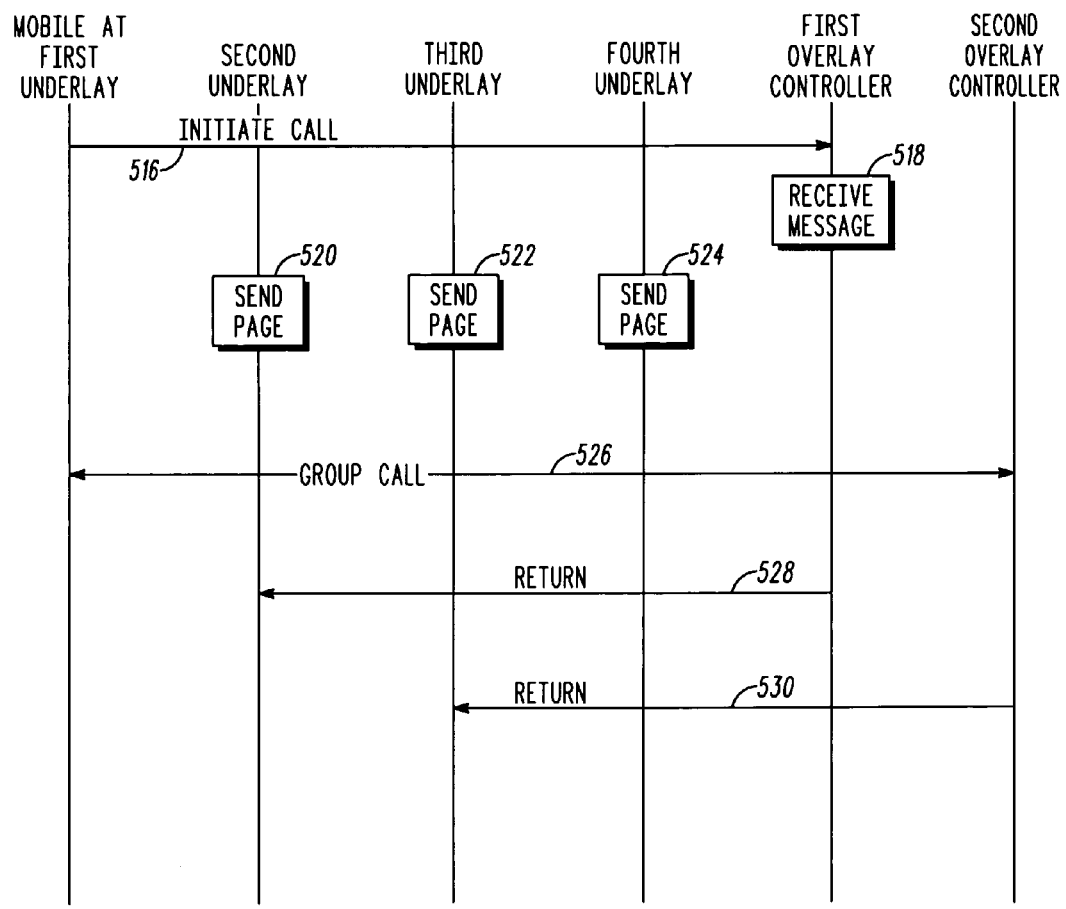
FIG. 5 is a call flow diagram showing another use of underlay and overlay cells to establish a group communication in accordance with one embodiment of the present invention.

Referring now to FIGS. 3*a* and 5, another example of the establishment and execution of a group communication call is described. A group communication is initiated by a mobile in the first underlay cell 302 to include as a talk group itself and mobiles located in the second and third underlay cells 304 and 312.

At step 516, a initiating mobile device at the first underlay cell initiates a group communication call with members of the talk group. The message indicates the identities of the mobiles in the talk group that the initiating mobile device wishes to establish a group communication. These mobile units may be identified in any number of ways for example, using a unique address or identifier to identify the members of the talk group.

At step 518, the message is received by a controller at a first overlay communication cell. For example, the message may be received by a network control device at the overlay communication cell. However, any other type of processing device may also receive and process the message.

At steps 520, 522, and 524, the controller at the first overlay communication cell initiates the sending of pages and pages are sent to the mobiles indicated in the message. The controller in the first overlay communication cell communicates with controllers in the second and third overlay cells so these controllers can page mobile units residing in the corresponding underlay cells. Then, a message is sent by this controller to initiate a page to locate members of the talk group and indicates the identity of the members of the talk group. Thus, a page is transmitted to any mobile within each of the first, second, third, and fourth underlay cells.

At step 526, a group communication call is established. In this case, the controller at the overlay communication cell activates the overlay communication cell without receiving any response from the mobile units. For example, the controller at each of the overlay cells stores the control channel information, which it assigns to the appropriate mobile units.

At steps 528 and 530, the mobile units return to an underlay cell. This underlay cell may be the same or different than the underlay cell that the mobile unit was originally located. During the time of the group call, measurements are made to indicate the quality of service at the underlay cells. Based upon these measurements, the mobile unit is returned to the best overlay cell.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method for facilitating communications amongst a plurality of mobile units in a network, comprising:
   establishing a plurality of underlay communication cells;
   positioning at least two of the plurality of mobile units in at least one of the plurality of underlay communication cells such that one of the at least two of the plurality of mobile units being in one of the plurality of underlay communication cells and that another of the at least two of the plurality of mobile units being in another of the plurality of underlay communication cells, the units being capable of communications via the underlay communication cells;
   establishing an overlay communication cell, the overlay communication cell covering the same area as at least the underlay cells that comprise the at least two of the plurality of mobile units;
   establishing an association between underlay cells that comprise the at least two mobile units and the overlay communication cell; and
   establishing a group communication call in which at least one of the plurality of mobile units communicates with at least another of the plurality of mobile units using the overlay cell wherein the establishing the group call includes listening for a page to set up the group call.

2. The method of claim 1 wherein establishing a group communication call farther comprises the at least two mobile units determining whether to return the page to the overlay cell and when to return the page to the underlay cell.

3. The method of claim 1 wherein establishing a group communication call farther comprises the at least two mobile units returning the page only to the overlay cell.

4. The method of claim 1 wherein establishing a group communication call further comprises the at least two mobile units returning the page only to the underlay cell.

5. The method of claim 1 wherein establishing a group communication call further comprises the at least two mobile units not returning the page.

6. The method of claim 5 further comprising activating an overlay in the absence of receiving a page.

7. The method of claim 1 wherein establishing a group communication call further comprises storing information at underlay cells identifying a control channel at the overlay cell.

8. A method of establishing a group communication call between mobile units comprising:
   receiving a setup request message from an originator mobile unit, the setup request message comprising information indicating at least one destination mobile unit with which to establish a group call;
   sending a group call request to the at least one destination mobile unit to request that the at least one destination mobile unit join the group call;
   determining an overlay cell for the at least one destination mobile unit to use for the group call wherein the overlay cell comprises at least two underlay cells; and
   establishing an audio path between the originator mobile unit and the at least one destination mobile unit within the overlay cell wherein the audio path provides for communication between the originator mobile unit and the destination mobile unit and wherein establishing the audio path includes the at least one destination mobile unit listening for a page to set up the audio path with the originator mobile unit.

9. The method of claim 8 wherein establishing the audio path further comprises the at least one destination mobile unit determining whether to return a page to the overlay cell and when to return the page to one of the at least two underlay cell.

10. The method of claim 8 wherein establishing the audio path further comprises the at least one destination mobile unit returning a page only to the overlay cell.

11. The method of claim 8 wherein establishing the audio path further comprises the at least one destination mobile unit not returning a page.

12. The method of claim 8 wherein establishing the audio path further comprises storing information at the at least two underlay cells identifying a control channel at the overlay cell.

13. A network comprising:
   a plurality of underlay communication cells;
   a plurality of mobile units, at least two of the plurality of mobile units being in different ones of the plurality of underlay communication cells;
   an overlay communication cell, the overlay communication cell comprising at least the respective underlay cells of the at least two mobile units;
   wherein the each of the underlay cells comprises a pointer address to the overlay cell; and
   a controller communicatively coupled to the underlay cells and the overlay cell, the controller establishing a group communication call in which at least one of the plurality of mobile units communicates with at least another of the plurality of mobile units by using the pointer address and wherein the controller sending pages to the mobile units and listening for return pages to establish the group communication call.

14. The method of claim 13 wherein the controller further comprises means for allowing the mobile unit to return a page using at least one of the overlay cell and one of the underlay cells.

15. The method of claim 13 wherein the controller further comprises means for allowing the mobile unit to return a page on the overlay cell.

16. The method of claim 15 wherein the controller further comprises means for storing address information for responding to a page.

17. A network controller device comprising:
- a register storing a group call request message, the message comprising identification of at least one mobile unit to be included in the group call;
- a processor that is coupled to the register, the processor forming and routing a page to the at least one mobile unit;
- a page receipt register storing a page response received responsively from the page, the page response comprising an identity of an overlay cell wherein the overlay cell comprises at least two underlay cells and wherein the at least one mobile unit to be included in the group call being in one of the at least two underlay cells;
- such that the processor establishes a group call with the at least one mobile unit using the overlay cell identified in the page response wherein the group call is for the at least one mobile units to communicate with the at least another mobile unit and wherein the processor listens for a page to establish the group call between the at least one mobile unit and at least another mobile unit.

* * * * *